US008288302B2

(12) United States Patent
Yoon et al.

(10) Patent No.: US 8,288,302 B2
(45) Date of Patent: Oct. 16, 2012

(54) METHOD OF PREPARING SUBSTRATES—MOLECULAR SIEVE LAYERS COMPLEX USING ULTRASOUND AND APPARATUSES USED THEREIN

(75) Inventors: Kyung Byung Yoon, Seoul (KR); Jin Seok Lee, Seoul (KR); Kwang Ha, Seoul (KR); Yun-Jo Lee, Seoul (KR); Yong Chang, Seoul (KR)

(73) Assignee: Industry University Cooperation Foundation Sogang University, Seoul (KR)

( * ) Notice: Subject to any disclaimer, the term of this patent is extended or adjusted under 35 U.S.C. 154(b) by 592 days.

(21) Appl. No.: 11/629,375

(22) PCT Filed: Jun. 23, 2005

(86) PCT No.: PCT/KR2005/001960
§ 371 (c)(1),
(2), (4) Date: Feb. 11, 2008

(87) PCT Pub. No.: WO2006/001648
PCT Pub. Date: Jan. 5, 2006

(65) Prior Publication Data
US 2008/0254969 A1    Oct. 16, 2008

(30) Foreign Application Priority Data

Jun. 23, 2004  (KR) .................. 10-2004-0047287
Jul. 1, 2004   (KR) .................. 10-2004-0051254

(51) Int. Cl.
*B01J 29/06*   (2006.01)
(52) U.S. Cl. ............... 502/60; 502/62; 502/63; 502/64; 502/67; 502/69; 502/71; 502/74; 502/77; 502/79
(58) Field of Classification Search .............. 502/60, 502/62, 63, 64, 67, 69, 71, 74, 77, 79
See application file for complete search history.

(56) References Cited

U.S. PATENT DOCUMENTS 6,689,195 B1   2/2004  Anthonis et al. ............. 95/143
2003/0224117 A1  12/2003  Kagan et al. ............. 427/407.1

FOREIGN PATENT DOCUMENTS

| JP | 2004-144752 | 5/2004 |
| KR | 1020010096777 | 11/2001 |
| WO | WO 99/19731 | 4/1999 |
| WO | WO 01/96106 A1 | 12/2001 |
| WO | WO 04/001416 | 12/2003 |

OTHER PUBLICATIONS

Kwang Ha, et al., Aligned monolayer assembly of zeolite crystals on platinum, gold, and indium-tin oxide surfaces with molecular linkages, Elsevier, Science Direct, Microporous and Mesoporous Materials 72 (2004) 91-98.

Kwang, Ha et al., Micropatterning of Oriented Zeolite Monolayers on Glass by Covalent Linkage, Advanced Materials, 2000, 12 (21) 1614-1617.
Goo Soo Lee, et al., Layer-by-Layer Assembly of Zeolite Crystals on Glass with Polyelectrolytes as Ionic Linkers, Journal of Am. Chem. Soc. 2001, 123, pp. 9769-9779.
Kwang Ha, et al., Photochemical Pattern Transfer and Patterning of Continuous Zeolite Films on Glass by Direct Dipping in Synthesis Gel, Advanced Materials, 2001, 13 (8) 594-596.
Goo Soo, Lee, et al., Preparation of Flexible Zeolite-Tethering Vegetable Fibers; Advanced Materials, 2001, 13 (14) 1491-1495.
Yu Sung Chun, et al. Diisocyanates as novel molecular binders for monolayer assembly of zeolite crystals on glass, Chem Commun, (2002) 1846-1847.
Jin Seon Park, et al., Organization of Microcrystals on Glass by Adenine-Thymine Hydrogen Bonding, J.Am. Chem. Soc., 2002, 124 13366-13367.
Jin Seon Park, et al., Marked Increase in Binding Strength between the Substrate and the Covalently Attached-Monolyaers of Zeolite Microcrystals by Lateral Molecular Cross-Linking between the Neighboring Microcrystals, J.Am. Chem. Soc., 2004, 126 1934-1935.
Laura C. Boudrou, et al. Deposition of Oriented Zeolite a Films: in Situ and Secondary Growth, J. of Membrane Science, 1999, 152, pp. 41-59.
Zhuyin Li et al., Self-Assembling Trimolecular Redox Chains at Zeolite Y Modified Electrodes, Inorg. Chem, 1989, 28, pp. 178-182.
JG Jansen, et al. Preparation of Coatings of Molecular Sieve Crystals for Catalysis and Separation; Stud, Surf. Catal. 1994, 85, pp. 215-250.
Geoffrey A. Ozin, Advanced Zeolite Materials Science, Advanced Materials, 28, 359, 159-176.
Geoffrey A. Ozin, et al., Silver Sodalites: Novel Optically Responsive Nancomposites, Journal of Inclusion Phonom. (1990) 6, pp. 379 393.
Marion Borja, et al., Storage of Light Energy by Photoelectron Transfer Across a Sensitized Zeolite-Solution Interface, Nature, 362, (1993) pp. 43-45.
Milan Sykora, et al., Photochemical Energy Storage in a Spatially Organized Zeolite-based Photoredox System, Nature, vol. 387, May 8, 1997, pp. 162-164.

(Continued)

*Primary Examiner* — Elizabeth Wood
(74) *Attorney, Agent, or Firm* — Frommer Lawrence & Haug LLP; Ronald R. Santucci

(57) ABSTRACT

The present invention relates to a method for preparing substrate-molecular sieve layer complex by vising ultra-sound and apparatuses used therein, more particularly to a method for preparing substrate-molecular sieve layer complex by combining substrate, coupling compound and molecular sieve particle, wherein covalent, ionic, coordinate or hydrogen bond between a substrate and a coupling compound; molecular sieve particle and coupling compound; coupling compounds; coupling compound and intermediate coupling compound is induced by using 15 KHz-100 MHz of ultrasound instead of simple reflux to combine substrate and molecular sieve particles by various processes, further to reduce time and energy, to retain high binding velocity, binding strength, binding intensity and density remarkably, to attach molecular sieve particle uniformly onto all substrates combined with coupling compound selectively, even though substrate with coupling compound and substrate without coupling compound exist together; and apparatuses installed therein, which can improve to produce substrate-molecular sieve layer complex in a large scale.

6 Claims, 7 Drawing Sheets

OTHER PUBLICATIONS

Alexander Kulak, et al., Orientation-Controlled Monolayer Assembly of Zeolite Crystals on Glass and Mica by Covalent Linkage of Surface-Bound Epoxide and Amine Groups, Alexander Kulak, Angew. Chem. Int. 2000, 19, No. 5, pp. 950-953.

Yeong Il Kim, et al.,Photochemical Charge Transfer and Hydrogen Evolution Mediated by Oxide Semiconductor Particles in Zeolite-Based Molecular Assemblies, J. Phys. Chem., B 1997, 101, pp. 2491-2500.

Debra R. Rolison, et al., Electrocatalysis and Charge-Transfer Reactions at Redox-Modified Zeolites, Accounts of Chemical Research, Nov. 200, vol. 33, No. 11, pp. 737-744.

Norman Hen-on, et al., Structure and Optical Properties of CdS Superclusters in Zeolite Hosts, J. of Am. Chem. Soc..1989, 111 pp. 530-540.

Thomas Bein, et al.,Encapsulation of Polypyrrole Chains in Zeolite Channels, Angew. Chem. Int. Ed. Engl. 28, 1989, pp. 1692-1694.

Gerd Grubert, et al., Titanium Oxide Species in Molecular Sieves: Materials for the Optical Sensing of Reductive Gas Atmospheres, Chem. Mater. 2002, 14, pp. 2458-2466.

Gion Calzaferri, et al.,Photonic Antenna System for Light Harvesting, Transport and Trapping, J. Mater. Chem. 2002, 12, pp. 1-13.

S.D. Cox, et al.,Inclusion Tuning of Nonlinear Optical Materials: Switching the SHG of p-Nitroaniline and 2-Methyl-p-nitroaniline with Molecular Sieve Hosts, J. Am. Chem. Soc. 1988, 110, pp. 2986-2987.

U. Vietze, et al.,Zeolite-Dye Microlasers, the American Physical Society, vol. 81, No. 21, Nov. 1998, pp. 4268-4631.

Kwang Ha, et al., Facile Assembly of Zeolite Monolayers on Glass, Silica, Alumina and other Zeolites using 3-Halopropylsilyl Reagents as Covalent Linkers, Advanced Materials, 2000, 12(15) pp. 1114-1117.

So Yeun Choi, et al., Monolayer Assembly of Zeolite Crystals on Glass with Fullerene as the Covalent Linker, J. Am. Chem. Soc. 2000, 22, pp. 5201-5209.

Goo Soo Lee et al. Orientation-Controlled Monolayer Assembly of Zeolite Crystals on Glass Using Terephthaldicarboxaldehyde as a Covalen Linker, Tetrahedron, 56, 2000, pp. 6965-6968.

Alexander Kulak et al. Polyamides as Strong Molecular Linkers for Monolayer Assembly of Zeolite Crystals on Flat and Curved Glass, J. Am. Chem. Soc., 2000, 122, 9308-9309.

METHOD OF PREPARING SUBSTRATES—MOLECULAR SIEVE LAYERS COMPLEX USING ULTRASOUND AND APPARATUSES USED THEREIN

This application is a 371 of PCT/KR2005/001960 filed on Jun. 23, 2005, published on Jan. 5, 2006 under publication number WO 2006/001648 A1 which claims priority benefits from Korean Patent Application No. 10-2004-0047287 filed Jun. 23, 2004 and Korean Patent Application No. 10-2004-0051254 filed Jul. 1, 2004.

TECHNICAL FIELD

The present invention relates to a method for preparing substrate-molecular sieve layer complex by using ultrasound and apparatuses used therein more particularly to a method for preparing substrate-molecular sieve layer complex by combining substrate, coupling compound and molecular sieve particle, wherein 15 KHz-100 MHz of ultrasonic wave is used to induce covalent, ionic, coordinate or hydrogen bond between a substrate and a coupling compound, molecular sieve particle and coupling compound, coupling compound and coupling compound, or coupling compound and intermediate coupling compound, instead of simple reflux and apparatuses installed therein, which combines substrate and molecular sieve particles by various processes, further economizes time and energy to have an excellent velocity of coverage, strength of coverage, degree of coverage and density, attaches molecular sieve particles uniformly onto all substrates combined with coupling compound selectively, even if substrates without coupling compound exist together, and thus, improves to produce substrate-molecular sieve layer complex in a large scale.

BACKGROUND ART

Zeolite is a general name of minerals in aluminum silicic acid hydride of alkali and alkaline earth metal and classified to several kinds according to 3-dimensional pore structure, shape and size. In the basic structure of zeolite, cation intervenes the substitution of Al ion for Si ion to compensate charge loss and water molecules occupy extra space remained. Zeolite discharges cation or water molecule to accept other molecules into a pore if heated at 200-300° C. for some time period. By this process, it may retain the size selectivity and the shape selectivity of minute particles. Thus, zeolite is often used for a molecular sieve.

Besides, zeotype molecular sieve substituting total or partial Si and Al's of zeolite by other elements is applied industrially. For example, zeolite-like material displacing cations by metal ions is useful for a cracking catalyst of crude oil in a petrochemical industry. Zeolite and its similar material can be a host carrier for desiccant of dehydration, adsorbent, gas purifier, additive of detergent, ion exchanger, soil reformer, sensor and the like.

Traditionally in researches of zeolite and zeolite-like material, molecular sieve particles are attempted to adhere on the surface of carrier efficiently, since zeolite and its similar material exist in a minute powder.

Precisely, the method for attaching zeolite particles by physical attraction between the surfaces of zeolite and substrate, after soaking substrate in a suspension comprising zeolite crystal, is disclosed for the simplest process [L. C. Boudreau, J. A. Kuck, M. Tsapatsis, and J. Membr. Sci. 1999, 152, 41-59]. In this procedure, zeolite particles can hardly prepare a homogeneous mono-layer, because the speed for bringing out zeolite from suspension should be adjusted to control the degree of dispersion in zeolite. Further, zeolite tends to dissociate easily from a substrate because zeolite is just physically adsorbed onto a substrate.

In addition, the method for applying a compound having methyldimethoxysiryl group (Me(MeO)$_2$Si—) at both ends as a spacer connecting substrate and zeolite, which comprises steps as follows: (a) combining a substrate and one methyldimethoxysiryl group in a compound having methyldimethoxysiryl groups at both ends by covalent bond; (b) mixing zeolite; and (c) inducing a covalent bond between the other methyldimethoxysiryl group and zeolite, is demonstrated [Z. Li, C. Lai, T. E. Mallouk, Inorg. Chem, 1989, 28, 178-182]. Unfortunately, zeolite cannot be controlled in the direction of particles, even if it is attached strongly, compared with other method for simply immersing zeolite in a suspension and rather, methyldimethoxysiryl groups at both ends of spacer may interfere with combining between a substrate and zeolite, since reacting with a substrate.

Besides, the method for attaching substrate and zeolite by using multi-step ionic bond, comprising steps (a) treating covalent-bonded aminopropyl group on the surface of substrate with chloric acid to confer positive charges on the surface by ammonium ions; and (b) treating sodium polystyrenesulfonic acid polymer on the surface of substrate to coat with negative-charged polymer, is described [L. C. Boudreau, J. A. Kuck, M. Tsapatsis, J. Membr. Sci. 1999, 152, 41-59]. This procedure is performed alternatively to form a thin membrane of zeolite by ionic bonding. Problematically, it is complicated to proceed more than 6 steps, cannot distribute zeolites exactly in an extent aspect, even if distributes uniformly and reduces the degree of coverage.

Furthermore, the method for synthesizing zeolite layer on the surface of substrate directly by enlarging the nucleus of zeolite particle on the surface, are suggested [J. C. Jansen, D. Kashchiev, A. Erdem-Senatalar, Stud, Surf. Catal. 1994, 85, 215-250]. Disadvantageously, substrate should not change the quality under a synthetic condition of zeolite and zeolite mono-layer cannot be controlled in the thickness, depending upon requirements.

Recently, zeolite and zeolite-like material are tried in various researches to be exploited for a new high-technological material since they can be manufactured to a nano-sized, small particle [G. A. Ozin, A. Kuperman, A. Stein, and Angew. Chem. Int. Ed. Engl. Adv. Mater. 28, 359 (1989)]. Especially, a use of host for 3-dimensional memory material [G. A. Ozin, A. Stein, G. D. Stucky, J. P. Godber, J. Inclusion Phenom. 6, 379 (1990)], apparatus for condensing light energy [M. Borja, P. K. Dutta, Nature 362, 43 (1993); M. Sykora, J. R. Kincaid, Nature 387, 162 (1997); Y. Kim et al., J. Phys. Chem. 101, 2491 (1997)], electrode supporting material [D. R. Rolison, C. A. Bessel, Acc. Chem. Res. 33, 737 (2000)], semi-conductor quantum dot and quantum wire [N. Hermon et al., J. Am. Chem. Soc. 111, 530 (1989)], molecular circuit [T. Bein, P. Enzel, Angew. Chem. Int. Ed. Engl. 12, 1737 (1989)], light sensor [G. Grubert, M. Stockenhuber, O. P. Tkachenko, M. Wark, Chem. Mater. 14, 2458 (2002)], luminescent body [G. Calzaferri et al., J. Mater. Chem. 12, 1 (2002)], nonlinear optical substance [S. D. Cox, T. E. Gier, G. D. Stucky, J. Bierlein, J. Am. Chem. Soc. 110, 2986 (1988)], raser luminescent element [U. Vietze et al., Phys. Rev. Lett. 81, 4628 (1998)] is actively investigated.

In order to settle disadvantages in the conventional methods for covering described above, the present inventors are tried to effectively utilize zeolite and its similar material recognized as a new high-technological material and developed a process for assembling 2-dimensional or 3-dimensional condensed structure (zeolite super-crystal) by distributing zeolite particles in a nano or micrometer size to a fixed direction [A. Kulak, Y.-J. Lee, Y. S. Park, K. B. Yoon, Angew. Chem. Int. Ed. 39, 950 (2000); S. Y. Choi Y. J. Lee, Y. S. Park, K. Ha, K. B. Yoon, J. Am. Chem. Soc. 122, 5201 (2000); A. Kulak, Y. S. Park, Y. J. Lee, Y. S. Chun, K. Ha, K. B. Yoon, J. Am. Chem. Soc. 122, 9308 (2000); G. S. Lee, Y. J. Lee, K. Ha, K. B. Yoon, Tetrahedron 56, 6965 (2000); K. Ha, Y. J. Lee, H. J. Lee, K. B. Yoon, Adv. Mater. 12, 1114 (2000); K. Ha, Y. J. Lee, D.-Y. Jung, J. H. Lee, K. B. Yoon, Adv. Mater. 12, 1614 (2000); G. S. Lee, Y.-J. Lee, K. B. Yoon, J. Am. Chem. Soc. 123, 9769 (2001); K. Ha, Y. J. Lee, Y. S. Chun, Y. S. Park, G. S. Lee, K. B. Yoon, Adv. Mater. 13, 594 (2001); G. S. Lee, Y. J. Lee, K. Ha, K. B. Yoon, Adv. Mater. 13, 1491 (2001); Y. S. Chun, K. Ha, Y. J. Lee, J. S. Lee, H. S. Kim, Y. S. Park, K. B. Yoon, Chem. Comm. 17, 1846 (2002); J. S. Park, G. S. Lee, Y. J. Lee, Y. S. Park, K. B. Yoon, J. Am. Chem. Soc. 124, 13366 (2002); J. S. Park, Y. J. Lee, K. B. Yoon, J. Am. Chem. Soc. 126, 1934 (2004); K. Ha, J. S. Park, K. S. Oh, Y. S. Zhou, Y. S. Chun, Y. J. Lee, K. B. Yoon, Micropor. Mesopor. Mater. (2004)]. In practice, the complex combining zeolite molecular sieve or its derivative onto substrate in a mono-layer or multi-layer and the method for preparation thereof are registered [Korean Pat No. 335966; PCT/KR00/01002].

In the above-mentioned patent, (1) the process for forming substrate-molecular sieve layer complex, which comprises steps (a) combining a substrate and a coupling compound (intermediate 1) by covalent bond; (b) combining molecular sieve particle and coupling compound (intermediate 2); and then, (c) combining intermediate 1 and intermediate 2 by using functional groups at the termini of 2 coupling compounds by covalent, ionic or coordinate bond; (2) the process for forming substrate-molecular sieve layer complex, which comprises steps (a) combining substrate or molecular sieve particle and one end of coupling compound by covalent bond; and (b) combining substrate or molecular sieve particle and the other end of coupling compound directly by covalent bond; (3) the process for forming substrate-molecular sieve layer complex by inserting a intermediate coupling compound between intermediate 1 and intermediate 2 to adjust the distance between a substrate and a molecular sieve particle; (4) the process for forming substrate-molecular sieve layer complex by performing the process (1)-(3) repeatedly; and the like are disclosed, which contributes to apply substrate-molecular sieve layer complex for new high-technological material. Unfortunately, this procedure is low in energy-efficiency and adhesion velocity, reduces compactness between zeolite particles and is low in bond strength between zeolite and substrate, because it adopts a simple reflux process to combine substrate and coupling compound, molecular sieve particle and coupling compound, coupling compound and coupling compound, and coupling compound and intermediate coupling compound. Moreover, it is difficult to prepare products in a large scale due to problematic simple reflux.

DISCLOSURE OF INVENTION

Technical Problem

In order to settle conventional problems, the present inventors have tried to combine a substrate and a coupling compound, a molecular sieve particle and a coupling compound, a coupling compound and a coupling compound, and a coupling compound and an intermediate coupling compound by using ultrasound instead of simple reflux. As a result, the present inventors have identified that the reaction between a substrate, a coupling compound, an intermediate coupling compound and a molecular sieve particle may reach covalent, ionic, coordinate, hydrogen bond or the like and various compounds may be adopted for a coupling compound, which reduces time and energy for preparing a substrate-molecular sieve layer complex, improves binding velocity, binding strength, binding intensity and density remarkably, and attaches molecular sieve particles uniformly onto all substrates combined with coupling compound selectively, even though substrate with coupling compound and substrate without coupling compound exist together. Therefore, the present invention is completed successfully to make substrate-molecular sieve layer complex produced in a large scale.

The object of the present invention is to provide a method for attaching molecular sieve particles on substrate in a mono- or multi-layered form by using 15 KHz-100 MHz of ultrasound as a binding energy source.

In addition, the object of the present invention is to provide an apparatus used in a method for attaching molecular sieve particles on a substrate in a mono- or multi-layered form by using ultrasound.

Technical Solution

The present invention provides a method for preparing substrate-molecular sieve layer complex, which comprises an induction stage combining a substrate and a coupling compound, molecular sieve particle and coupling compound, coupling compound and coupling compound, or coupling compound and intermediate coupling compound by using 15 KHz-100 MHz of ultrasound.

Hereinafter, the present invention will be described in greater detail.

The present invention relates to a method for preparing substrate-molecular sieve layer complex by using ultrasound and apparatuses used therein, more particularly to a method for preparing substrate-molecular sieve layer complex by combining substrate, coupling compound and molecular sieve particle, wherein 15 KHz-100 MHz of ultrasonic wave is used to induce covalent, ionic, coordinate or hydrogen bond between a substrate and a coupling compound, a molecular sieve particle and a coupling compound, a coupling compound and a coupling compound, or a coupling compound and an intermediate coupling compound, instead of simple reflux and apparatuses installed therein, which combines a substrate and molecular sieve particles by various processes, further economizes time and energy to heave an excellent velocity of coverage, strength of coverage, degree of coverage and density, attaches molecular sieve particles uniformly onto all substrates combined with coupling compound selectively, even if substrates without coupling compound exist together, and thus, improves to produce substrate-molecular sieve layer complex in a large scale.

In the present invention, terminologies are defined as follows.

"Substrate" means one compound selected from the group consisting of the following 6 compounds as set forth hereunder:

1. an oxide containing one or more metal and nonmetal element such as silicon, aluminum, titanium, tin, indium and having a hydroxyl group on the surface; Preferably, various transductive glasses such as quartz, mica, glass, ITP glass (glass covered with tin indium oxide by vacuum evaporation) and tin oxide ($SnO_2$), silica, porous silica, alumina, porous alumina, titanium dioxide, silicon wafer and the like can be included.

2. a metal reacting with a thiol group (—SH) or an amine group (—$NH_3$) such as gold, silver, copper and platinum;

3. a polymer having a functional group on the surface; Preferably, polyvinyl chloride (PVC), Merrifield peptide resin and the like can be included.

4. a semi-conductive compound such as zinc selenium (ZnSe), gallium arsenic (GaAs) or indium phosphide (INP), or sulfide, selenium compound or phosphide having semiconductive property;

5. a natural or synthetic zeolite or zeotype porous molecular sieve;

6. a natural polymer having a hydroxyl group on the surface such as cellulose, starch (amylose and amylopectin) and lignin, or natural polymer applicable to have a hydroxyl group on the surface and conductive polymer.

"Molecular sieve" denotes a filter to separate molecules according to size, when several molecules are mixed. Preferably, all porous oxides having a hydroxyl group on the surface, or sulfide can be included. The basic element for forming molecular sieve can be transition element such as titanium, vanadium, zirconium, manganese, chromium, iron, cobalt, nickel, copper and zinc as well as type element such as silicon, aluminum, gallium, boron, phosphorous, oxygen and sulfur. In the present invention, cation substituted to a pore or cation synthesized by ship-in-a-bottle technique can be included, regardless of kinds. More preferably, the molecular sieve can be selected from the group consisting of the following 8 compounds as set forth hereunder:

1. natural and synthetic zeolite;

2. MFI structured zeolite and its similar material (ZSM-5, silicalite-1, TS-1 or metalo-silicalite-1 substituting partially for transition metal and the like);

3. MFI structured zeolite and its similar material (ZSM-11, silicalite-2, TS-2 or metalo-silicalite-2 substituting partially for transition metal and the like);

4. zeolite A, X, Y, L, beta, modenite, perialite, ETS-4 or ETS-10 and the like;

5. meso-porous silica (MCM series, SBA series, MSU series and KIT series);

6. an organic-inorganic complex meso-pore structured body or laminated material (day, yellow ocher series);

7. a nano-porous material called as organic zeolite, organic metal zeolite or coordinate compound zeolite that combines metal ion and ligand in a 3-dimension to form nano-pores;

8. a complex permeated with organic, inorganic, organic-inorganic dye mixture, luminescent dye or pigment within pores of porous material or between layers of laminated material;

"Coupling compound" denotes a compound derived from one or more organic compounds selected from the group consisting of compounds of Formula 1-7, $$Z-L1-X \qquad <\text{Formula 1}>$$

In the above Formula 1, Z is $R_3Si$ or isocyanate (—NCO); R is halogen, $C_1$-$C_4$ alkoxy or $C_1$-$C_4$ alkyl and at least one R among three R's is halogen or alkoxy; L1 is a substituted or non-substituted $C_1$-$C_{17}$ hydrocarbon residue such as alkyl, aralkyl or aryl and contains one or more oxygen, nitrogen or sulfur; and X is halogen, isocyanate (—NCO), tosyl or azide.

$$MR'_4 \qquad <\text{Formula 2}>$$

In the above Formula 2, M is silicon, titanium or zirconium; and R' is halogen, $C_1$-$C_4$ alkoxy or $C_1$-$C_4$ alkyl and at least two R's among four R's is halogen or alkoxy.

$$R_3Si-L1-Y \qquad <\text{Formula 3}>$$

In the above Formula 3, R is halogen, $C_1$-$C_4$ alkoxy or $C_1$-$C_4$ alkyl and at least one R among three R's is halogen or alkoxy; L1 is a substituted or non-substituted $C_1$-$C_{17}$ hydrocarbon residue such as alkyl, aralkyl or aryl and contains one or more oxygen, nitrogen or sulfur; Y is an organic functional group such as hydroxyl, thiol, amine, ammonium, sulfone and its salt, carboxylic acid and its salt, acid anhydride, epoxy, aldehyde, ester, acryl, isocyanate (—NCO), sugar residue, double bond, triple bond, diene, diyne, alkylphospin, alkyl acine, and a reactive functional group such as coordinate compound exchanging ligand, and can be located at the middle of coupling compound or at the terminus.

$$HS-L1-X \qquad <\text{Formula 4}>$$

In the above Formula 4, L1 is a substituted or non-substituted $C_1$-$C_{17}$ hydrocarbon residue such as alkyl, aralkyl or aryl and contains one or more oxygen, nitrogen or sulfur; and X is halogen, isocyanate (—NCO), tosyl or azide.

$$HS-L1-SiR_3 \qquad <\text{Formula 5}>$$

In the above Formula 5, R is halogen, $C_1$-$C_4$ alkoxy or $C_1$-$C_4$ alkyl and at least one R among three R's is halogen or alkoxy; and L1 is a substituted or non-substituted $C_1$-$C_{17}$ hydrocarbon residue such as alkyl, aralkyl or aryl and contains one or more oxygen, nitrogen or sulfur.

$$HS-L1-Y \qquad <\text{Formula 6}>$$

In the above Formula 6, L1 is a substituted or non-substituted $C_1$-$C_{17}$ hydrocarbon residue such as alkyl, aralkyl or aryl and contains one or more oxygen, nitrogen or sulfur; and Y is an organic functional group such as hydroxyl, thiol, amine, ammonium, sulfone and its salt, carboxylic acid and its salt, acid anhydride, epoxy, aldehyde, ester, acryl, isocyanate (—NCO), sugar residue, double bond, triple bond, diene, diyne, alkylphospin, alkyl acine, and a reactive functional group such as a coordinate compound exchanging ligand, and can be located at the middle of a coupling compound or at the terminus.

$$Z-L2(+)L3(-)-Y \text{ or } Z-L3(-)L2(+)-Y \qquad <\text{Formula 7}>$$

In the above formula 7, Z is $R_3Si$ or isocyanate (—NCO); R is halogen, $C_1$-$C_4$ alkoxy or $C_1$-$C_4$ alkyl and at least one R among three R's is halogen or alkoxy; L2(+) is a functional group having at least one more positive charge (+) in terminus, straight chain or branched chain of substituted or non-substituted $C_1$-$C_{17}$ hydrocarbon compound to contain one more oxygen, nitrogen or sulfur; and L3(−) is a functional group having at least one more negative charge (−) in terminus, straight chain or branched chain of substituted or non-substituted $C_1$-$C_{17}$ hydrocarbon compound to contain one more oxygen, nitrogen or sulfur).

"Intermediate coupling compound" means a compound selected from the group consisting of fullerene ($C_{60}$, $C_{70}$), carbon nano tube, α,ω-dialdehyde, dicarboxylic acid, dicarboxylic add anhydride, amine-dendrimer, polyethyleneimine, α,ω-diamine, metal porphyrin and complex compound depicted as M (salen) (M is cobalt, nikel, chrome, manganese or iron; saline is N,N'-bis(salicylidene)ethylenediamine).

Above all, substrate and coupling compound (intermediate 1), molecular sieve particle and coupling compound (intermediate 2) and the like are prepared before substrate-molecular sieve layer complex is prepared.

As described above, substrate and molecular sieve particles have a functional group such as a hydroxyl group on the surface. Preferably, hydroxyl group can be a precursor of hydroxyl group or any other functional group changeable to a hydroxyl group and more preferably, acyloxy group, methoxy group, Si=O group and the like.

It is natural that those skilled in the art may acknowledge the reaction between substrate or molecular sieve particle and coupling compound such as a hydroxyl group in respect of mechanism and condition. After the reaction is completed, molecular sieve particles if not combined are removed by ultrasonic vibration.

In the method for preparation of the present invention, substrate-molecular sieve layer complex can be prepared by various processes, depending upon the kinds of substrate and molecular sieve particle, the kind of coupling compound, the kind of intermediate coupling compound and the like. Representative coupling processes will be described dearly as follows.

First, substrate-molecular sieve layer complex is substrate-coupling compound-molecular sieve particle prepared by the process comprising steps: (1) combining a substrate and a coupling compound (intermediate 1); and then, (2) combining intermediate 1 and molecular sieve particle by using ultrasonic wave. On the contrary, it can be prepared by the process (1) first combining molecular sieve particle and coupling compound (intermediate 2); and then, (2) combining intermediate 2 and substrate. Preferably, the coupling compound can be (3-chloropropyl) trimethoxysilane, 3-(triethoxysiryl) propylisocyanate and the like. Depending upon cases, substrate-molecular sieve layer complex can be prepared by the procedure pouring substrate, coupling compound and molecular sieve particle together into an apparatus for preparation, and then combining. Preferably, the coupling compound can be tetraethoxysilane, silicon tetrachloride and the like.

Second, substrate-molecular sieve layer complex is substrate-coupling compound-coupling compound-molecular sieve particle prepared by the process comprising steps: (1) combining a substrate and a coupling compound (intermediate 1); then, (2) combining molecular sieve particle and coupling compound (intermediate 2); and (3) combining intermediate 1 and intermediate 2 by using ultrasonic wave. Preferably, the coupling compound should react each other between intermediate 1 and intermediate 2. More preferably, substitution (amino group and leaving group), ionic bonding (ammonium group and carboxyl group and its salt), Diels-Alder reaction (diene group and double bond), cycle-opening reaction (epoxy group and amino group), ester or amide forming reaction, glycosidic bonding and the like.

Third, substrate-molecular sieve layer complex is substrate-coupling compound-intermediate coupling compound-coupling compound-molecular sieve particle prepared by the process comprising steps: (1) combining a substrate and a coupling compound (intermediate 1); (2) combining molecular sieve particle and coupling compound (intermediate 2); and then, (3) adding intermediate coupling compound to connect intermediate 1, intermediate coupling compound and intermediate 2 by using ultrasonic wave. Meanwhile, the intermediate coupling compound can be combined first with intermediate 1 or intermediate 2 and then, combined with intermediate 2 or intermediate 1. Preferably, the reaction pair of coupling compound-intermediate coupling compound can be a separating group such as fullerene or carbon nano tube-amino terminal group, $\alpha,\omega$-dialdehyde, dicarboxylic acid, dicarboxylic acid anhydride-amino terminal group, amine-dendrimer-epoxy group and halogen, and a separating group such as polyethyleneimine, dimine-epoxy and halogen In order to perform the process for preparing substrate-molecular sieve layer complex preferably, the present invention provides an apparatus for preparing substrate-molecular sieve layer complex (100), which comprises a reaction container (10) filling reactant of solvent 1 and substrate-molecular sieve layer complex, an external container (20) filling solvent 2 and housing a reaction container, an ultrasound generator (30) and a temperature controller (40).

The reaction container (10) is filled with solvent 1 (Si) and reactants including substrate, coupling compound, intermediate coupling compound, molecular sieve particle and the like. The solvent 1 is a solvent that can disperse molecular sieve particles and preferably, organic solvent including toluene, hexane, benzene, carbon tetrachloride, octane, alcohol and the like. When ultrasonic wave is transmitted, the reaction between a substrate and a coupling compound, a molecular sieve particle and a coupling compound, a coupling compound and a coupling compound, or a coupling compound and an intermediate coupling compound is proceeded to prepare substrate-molecular sieve layer complex. The reaction container filling solvent 1 (S1) is not limited in the shape and if it is a round-bottomed flask, the reaction container can be connected to an external container (30) filling solvent 2 (S2) by using a fixing device such as stand.

The substrate is preferable to be added to a reaction container (10) by using a holder such as Teflon carrier, but can be combined in a reaction container (1) filling solvent 1 (S1) without extra holder. One sheet of substrate can be added to a reaction container (10) to combine molecular sieve particle and the like, respectively, but several sheets of a substrate can be overlapped coincidently, depending upon requirements (See FIGS. 2A and 2B). When overlapped, only a substrate combined with a coupling compound can be added in several sheets or a substrate with a coupling compound and substrate without a coupling compound can be added in a mixed state (See FIGS. 3A and 3B).

The method of preparing substrate-molecular sieve layer complex by using ultrasonic wave can be divided to A type ultrasound process and B type ultrasound process. Precisely, in A type ultrasound process, one sheet of a substrate combined with a coupling compound and molecular sieve particles is combined or one sheet of a substrate and molecular sieve particle combined with coupling compound is combined in a reaction container. Otherwise, in B type ultrasound process, several sheets of substrate combined with one or more same or different kind of a coupling compound and a substrate without a coupling compound are overlapped in a reaction container to combine coupling compound and molecular sieve particles. In B type ultrasound process, the outermost substrate is not required to be substrate without coupling compound.

The external container (20) is filled with solvent 2 (S2) and accommodates a reaction container (10). Preferably, solvent 2 can be a solvent such as water ($H_2O$) to transmit ultrasound generated from an ultrasound generator (30) to reactants in the reaction container. Preferably, the liquid level of solvent 2 (S2) is higher than the liquid level of solvent 1 to absorb heat of reaction efficiently. As depicted in FIG. 1d, when substrate and molecular sieve particles are induced to combine in an external container (20), excluding a reaction container (10) filling solvent 1 (S1), solvent 1 (S1) can be filled in an external container (20) instead of solvent 2 (S2).

Within solvent 2 (S2) of an external container (20), a circulation coil of cooling water (41) is immersed as a part of temperature controller (40). The circulation coil of cooling water (41) circulates cooling water out of the temperature controller (40) through coil, absorbs heat of reaction generated in a reaction container (10) and maintains solvent 2 (S2) at a fixed temperature.

The ultrasound generator (3) is a device generating 15 KHz-100 MHz of ultrasonic wave and further comprises a controller that adjusts frequency and output power of ultrasound. The ultrasound generator can transmit ultrasonic wave to an external container (20) filling solvent 2 (S2) (See FIG. 1a), transmit ultrasonic wave directly to solvent 1 (S1) (See FIG. 1b) or transmit ultrasonic wave to solvent 2 (S2) (See FIG. 1c) to induce the reaction between substrate, coupling compound, intermediate coupling compound and molecular sieve particle.

The temperature controller (40) comprises a generator of cooling water (41) and a circulation coil of cooling water (42). The generator of cooling water (41) can include a device to control the flow rate of cooling water and absorbs heat generated from a reaction container (10) by cooling water that discharges from the generator, flows through a circulation coil of cooling water, and returns to the generator after adjusting temperature at a fixed level. As illustrated in FIG. 1a, the circulation coil of cooling water (42) can be immersed in solvent 2 (S2) or winds the outer surface of reaction container (10) or the outer surface of external container (20).

FIG. 1a depicts the basic structure of apparatus (100) of the present invention for preparing substrate-molecular sieve layer complex by using ultrasound. The modified structure of apparatus is illustrated in FIG. 1b and FIG. 1c to change the injection portion of ultrasound generator (30). Besides, substrate-molecular sieve layer complex can be prepared by using only an external container (20) excluding a reaction container (10). FIG. 1d depicts the applied structure of apparatus for preparing substrate-molecular sieve layer complex excluding a reaction container (10). At this moment, solvent 1 (S1) can be put into an external container (20) instead of solvent 2 (S2).

The apparatus (100) of the present invention for preparing substrate-molecular sieve layer complex with ultrasound, can be used to prepare substrate-molecular sieve layer complex as described below.

Above all, when substrate-coupling compound (intermediate 1) and molecular sieve particle are combined to prepare substrate-molecular sieve layer complex, the substrate is washed out, dried to remove contaminants and put into a reaction container filling organic solvent such as toluene to combine a coupling compound by using ultrasonic wave. Intermediate 1 can be prepared by using simple reflux without ultrasonic wave. The resulting substrate combined with coupling compound is picked out of flask, washed again by using organic solvent such as pure toluene and dried under nitrogen current. If intermediate coupling compound needs to be combined in substrate-coupling compound-intermediate compound, the same procedure is repeated with the above. After that, molecular sieve particles are added to a reaction container (10) filling organic solvent, exposed to ultrasound for about 5-15 minutes according to the kind of molecular sieve particle and dispersed. Then, substrate-coupling compound (intermediate 1) prepared previously is combined with molecular sieve particle for 1-2 minutes by using ultrasound to prepare substrate-molecular sieve layer complex in a compact structure.

When molecular sieve particle-coupling compound (intermediate 2) is prepared first, the same procedure is also performed. When intermediate 1 and intermediate 2 are prepared and then, combined, the similar procedure is also accomplished to the above.

Preferably, ultrasound can be in the frequency range of 15 KHz-100 MHz and used to increase the reactivity of molecules in covalent, ionic, coordinate or hydrogen bond between a substrate and a coupling compound, molecular sieve particle and coupling compound, coupling compound and coupling compound, or coupling compound and intermediate coupling compound and to enhance the bonding for a short time. In contrast, if ultrasound is over or under the range, molecular sieve particles are not combined favorably. More preferably, ultrasound can be in the frequency range of 15 KHz-1 MHz. In this range, the velocity of coverage in molecular sieve particles decreases and the strength of coverage in substrate-molecular sieve layer complex increases. The electric power call be adjusted properly according to the frequency.

Through the procedure described above, molecular sieve mono-layer is first formed on a substrate and again combined with the second molecular sieve particle binding to the mono-layer to prepare a double layer on the substrate. This procedure can be repeated to prepare multi-layer. The second molecular sieve particle can be the same kind with the first particle forming mono-layer or different kind from the first particle. At this moment, the pattern of lamination is not limited and preferably, (substrate-coupling compound-molecular sieve particle)-(coupling compound-molecular sieve particle), (substrate-coupling compound)-(coupling compound-molecular sieve particle-coupling compound)-(coupling compound-molecular sieve particle) and the like.

Through the procedure described above, if coupling compound and the like is removed at a high temperature by plasticity after mono-layer is produced on substrate, substrate and molecular sieve can combine directly by chemical bonding like silicon-oxygen-silicon and so on. This procedure can be repeated to produce multi-layer combining substrate and molecular sieve directly.

BRIEF DESCRIPTION OF THE DRAWINGS

The above and other objects, features and other advantages of the present invention will be more clearly understood from the following detailed description taken in conjunction with the accompanying drawings, in which.

MODE FOR THE INVENTION

Figure 1A:
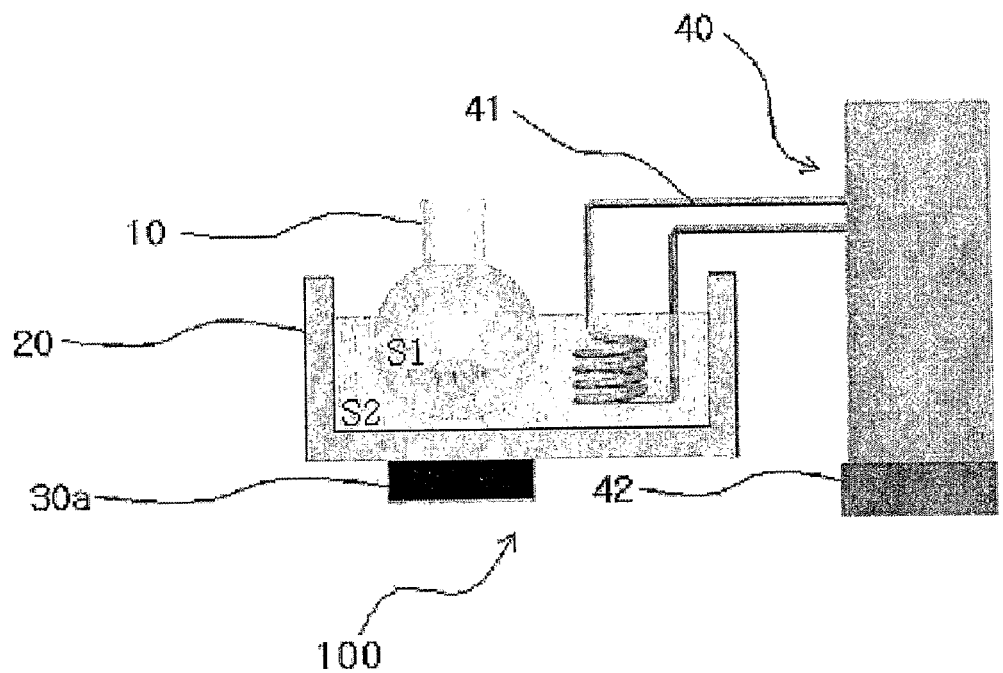
FIG. 1a depicts the basic structure of apparatus (100) of the present invention for preparing substrate-molecular sieve layer complex by using ultrasound, which comprises a reaction container (10) filing solvent 1 (S1) and reactant of substrate-molecular sieve layer complex, an external container (20) filling solvent 2 (S2) and housing a reaction container, an ultrasound generator (30a) and a temperature controller (40) comprising a generator of cooling water (41) and a circulation coil of cooling water (42)
Figure 1B:
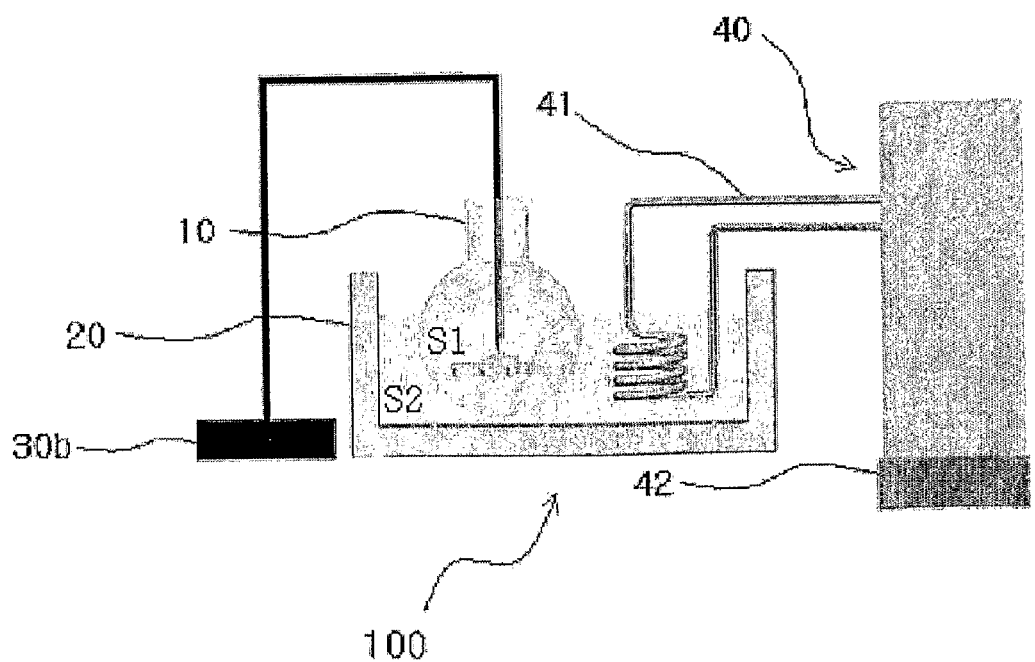
FIG. 1b depicts the structure of apparatus (100) for preparing substrate-molecular sieve layer complex by using modified ultrasound (30b) to transmit ultrasound directly to a reaction container (10) filling solvent 1 (S1) and the reactant of substrate-molecular sieve layer complex.
Figure 1C:
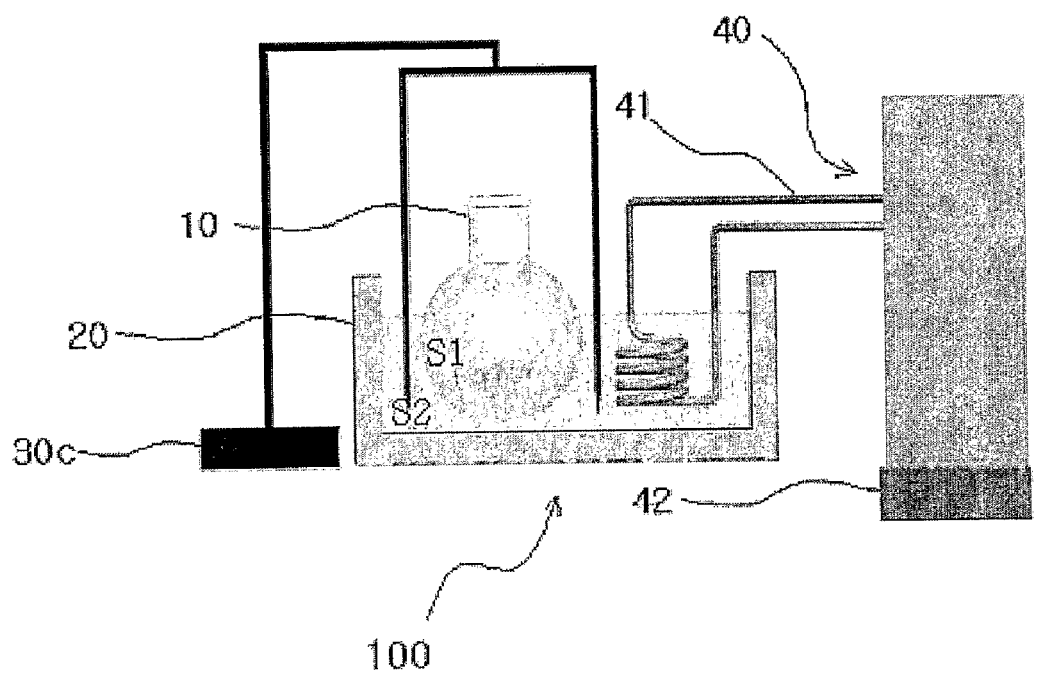
FIG. 1c depicts the structure of apparatus (100) for preparing substrate-molecular sieve layer complex by using modified ultrasound (30c) to transmit ultrasound directly to an external container (20) filling solvent 2 (S2) and housing a reaction container (10)
Figure 1D:
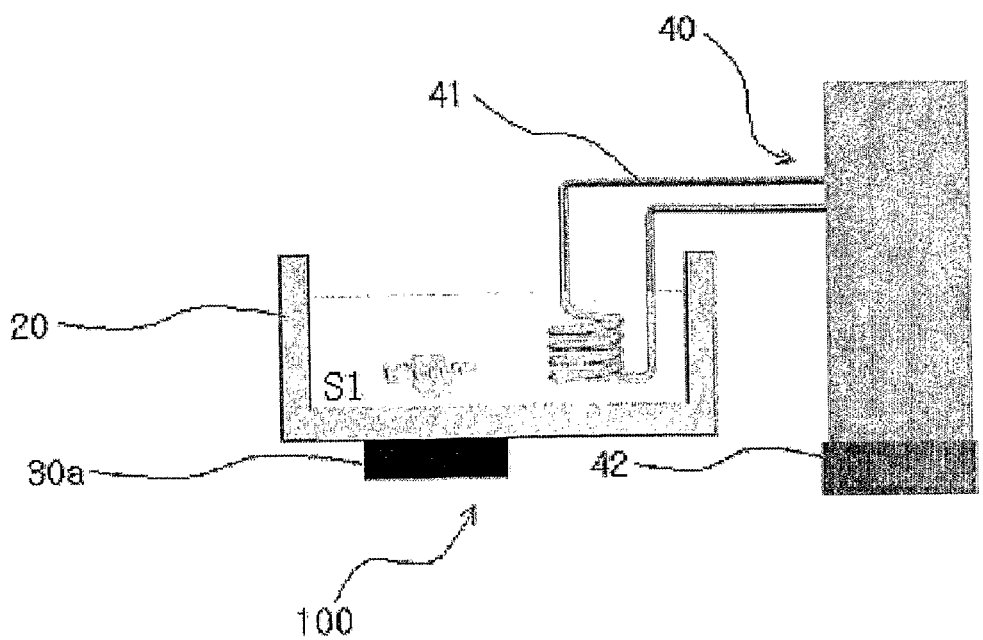
FIG. 1d depicts the structure of apparatus for preparing substrate-molecular sieve layer complex excluding a reaction container (10)
Figure 2:
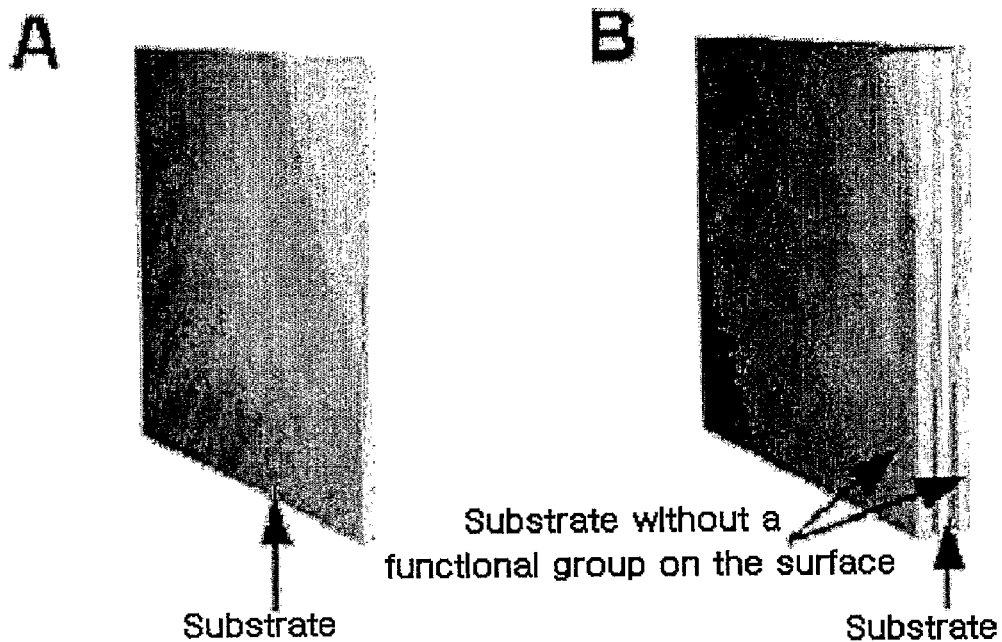
FIG. 2 depicts the morphology of substrate used in A type ultrasound process of the present invention.
Figure 3:
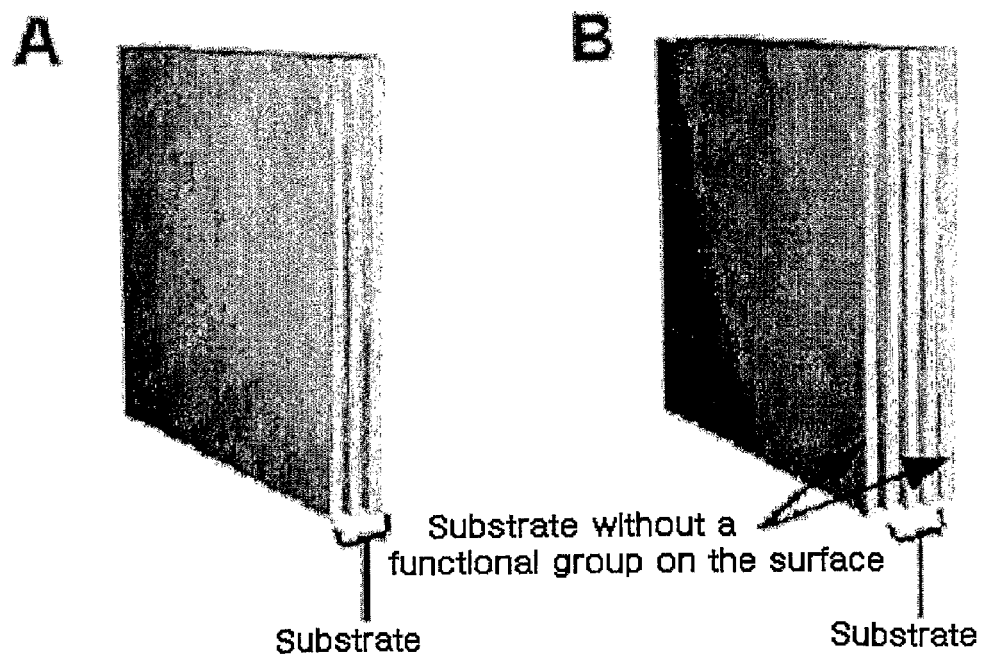
FIG. 3 depicts the morphology of substrate magnifying the morphology of substrate of FIG. 2.

Practical and presently preferred embodiments of the present invention are illustrated as shown in the following Examples.

However, it will be appreciated that those skilled in the art, on consideration of this disclosure, may make modifications and improvements within the spirit and scope of the present invention.

Example 1-10

Example 1

Preparation of Silicalite Mono-Layer by Using 3-Chloropropyltrimethoxysilane (1) Preparation of Glass Combined with 3-Chloropropyltrimethoxysilane Glass plate was placed in piranha solution (mixing $H_2SO_4$ and $H_2O$ in 7:3 of ratio) for 30 minutes, picked out, washed with distilled water and then, dried under nitrogen current in a high purity. The resulting glass plate was soaked in 100 ml reaction container filling 80 ml of toluene dissolving 0.5 g of 3-chloropropyltrimethoxysilane, coated on the surface with 3-chloropropylmono-layer to prepare glass CP-G by using ultrasound or simple reflux solely or by using both processes coordinately. After that, glass plate CP-G was picked out washed by using pure toluene and then, dried under nitrogen current in a high purity.

(2) Preparation of Silicalite Mono-Layer by A Type Ultrasound Process 50 mg of silicalite in 2 μm of particle size was poured into 50 ml reaction container and then, 40 ml of pure toluene was added. The toluene solution was dispersed for 5 minutes by using an ultrasonic washing machine and comb-shaped Teflon holder was put into the solution and inserted with one sheet of CP-G prepared above between teeth of comb. The reaction container was placed on the internal bottom of the apparatus for preparation using ultrasonic wave and fixed on a stand. The apparatus for preparation was filled with water to submerge the reaction container sufficiently until reaching the liquid level of toluene included in the container and adjusted with a temperature controller to maintain water temperature to 20° C. After that, silicalite was attached on the surface of CP-G for 2 minutes by using 28 KHz frequency of ultrasonic wave (under 95 W of electric power) through an ultrasonic generator.

(3) Preparation of Silicalite Mono-Layer by Using B Type Ultrasound Process

This procedure was similar to A type ultrasound process on the whole, but CP-G's were overlapped in an order by glass not forming molecular sieve even after reaction, CP-G, glass not forming molecular sieve between teeth of comb in a Teflon holder, instead of one sheet of CP-G insertion. At this moment, the glass not forming molecular sieve even after reaction can be bare glass only washed out without any treatment or can be specially treated not to induce a reaction with molecular sieve. The other procedure was the same with A type ultrasound process.

(4) Preparation of Silicalite Mono-Layer by Using Simple Reflux Process (Common Knowledge)

50 mg of silicalite in 2 μm of particle size was put into 50 ml reaction container and then, 40 ml of pure toluene was added. The toluene solution was dispersed for 5 minutes by using an ultrasonic washing machine and comb-shaped Teflon substrates were added into the solution. Then, a cooler was installed and refluxed for 3 hours.

Example 2

Preparation of Zeolite A Mono-Layer by Using 3-Chloropropyltrimethoxysilane (1) Preparation of Zeolite A Mono-Layer by A Type Ultrasound Process 50 mg of zeolite A crystal was poured into a reaction container including 40 ml of pure toluene and dispersed by using an ultrasonic washing machine. Then, comb-shaped Teflon substrates were put into the solution and inserted with one sheet of CP-G prepared in Example 1 between teeth of comb. The reaction container was placed on the internal bottom of the apparatus for preparation using ultrasonic wave and fixed on a stand. The apparatus for preparation was filled with water to submerge the reaction container sufficiently until reaching the liquid level of toluene included in the container and adjusted by using a temperature controller to maintain water at 20° C. After that, zeolite A was attached on the surface of CP-G for 2 minutes by using 28 KHz frequency of ultrasonic wave (under 95 W of electric power) through an ultrasonic generator.

(2) Preparation of Zeolite A Mono-Layer by Using B Type Ultrasound Process

This procedure was similar to A type ultrasound process on the whole, but CP-G's were overlapped in an order by glass not forming molecular sieve even after reaction, CP-G, glass not forming molecular sieve between teeth of comb in Teflon substrates, instead of one sheet of CP-G insertion. The other procedure was the same with A type ultrasound process.

(3) Preparation of Zeolite A Mono-Layer by Using Simple Reflux Process (Common Knowledge)

50 mg of zeolite A was put into 50 ml reaction container and 40 ml of pure toluene was added. The toluene solution was dispersed for 5 minutes by using an ultrasonic washing machine and comb-shaped Teflon substrates were added into the solution. Then, a cooler was installed and refluxed for 3 hours.

Example 3

Preparation of Yellow Ocher Particle (Laminated Material) Mono-Layer by Using 3-Chloropropyltimethoxysilane

(1) Preparation of Yellow Ocher Mono-Layer by A Type Ultrasound Process 50 mg of yellow ocher particle having 1-2 μm of size was put into a reaction container including 40 ml of pure toluene and dispersed uniformly by using an ultrasonic washing machine. Then, comb-shaped Teflon substrates were put into the solution and inserted with one sheet of CP-G prepared in Example 1 between teeth of comb. The round flask was placed on the internal bottom of the apparatus for preparation using ultrasonic wave and fixed on a stand. The apparatus for preparation was filled with water to submerge the round flask sufficiently until reaching the liquid level of toluene included in the flask and adjusted by using a temperature controller to maintain water at 20° C. After that, yellow ocher particles were attached on the surface of CP-G for 2 minutes by using 28 KHz frequency of ultrasonic wave (under 95 W of electric power) through an ultrasonic generator.

(2) Preparation of Yellow Ocher Mono-Layer by Using B Type Ultrasound Process

This procedure was similar to A type ultrasound process on the whole, but CP-G's were overlapped in an order by glass not forming molecular sieve even after reacting with yellow ocher particles, CP-G, glass not forming molecular sieve between teeth of comb in Teflon substrates, instead of one sheet of CP-G insertion. At this moment, the glass not forming molecular sieve even after reacting with yellow ocher particles can be bare glass only washed without any treatment or can be specially treated not to induce a reaction with molecular sieve. The other procedure was the same with A type ultrasound process.

(3) Preparation of Zeolite A Mono-Layer by Using Simple Reflux Process (Common Knowledge)

50 mg of zeolite A was put into 50 ml reaction container and 40 ml of pure toluene was added. The toluene solution was dispersed for 5 minutes by using an ultrasonic washing machine and comb-shaped Teflon substrates were added into the solution. Then, a cooler was installed and refluxed for 3 hours.

Example 4

Preparation of Silicalite Mono-Layer by Using 3-Triethoxysirylpropylisocyanate

(1) Preparation of Glass Combined with 3-Triethoxysirylpropylisocyanate

As described in Example 1, several sheets of glass plate were washed out and placed to a reaction container filling toluene and 3-triethoxysirylpropylisocyanate was added. The resulting glass plate was coated with 3-triethoxysirylpropylisocyanate on the surface to prepare the glass coated with 3-propylisocyanate mono-layer by using ultrasound or simple reflux solely or by using both processes coordinately. After that, the glass plate forming isocyanate mono-layer was picked out of the reaction container, washed by using pure toluene and then, dried under nitrogen current in a high purity.

(2) Preparation of Silicalite Mono-Layer by A Type Ultrasound Process 50 mg of silicalite was put into a reaction container filling 40 ml of toluene and dispersed uniformly by using an ultrasonic washing machine. Then, comb-shaped Teflon substrates were put into the toluene solution and inserted with one sheet of CP-G coated with isocyanate mono-layer between teeth of comb. The reaction container was placed on the internal bottom of the apparatus for preparation using ultrasonic wave and fixed on a stand. The apparatus for preparation was filled with water to submerge the reaction container sufficiently until reaching the liquid level of toluene included in the container and adjusted with a temperature controller to maintain water at 20° C. After that, silicalite was attached on the surface of glass coated with isocyanate mono-layer for 2 minutes by using 28 KHz frequency of ultrasonic wave (under 95 W of electric power) through an ultrasonic generator.

(3) Preparation of Silicalite Mono-Layer by Using B Type Ultrasound Process

This procedure was similar to A type ultrasound process on the whole, but glass plates were overlapped in an order by glass not combining even after reacting molecular sieve, glass plate coated with molecular sieve mono-layer of isocyanate, glass not combining coupling compound between teeth of comb in Teflon substrates, instead of one sheet of glass plate coated with the molecular sieve mono-layer of isocyanate. The other procedure was the same with A type ultrasound process.

(4) Preparation of Silicalite Mono-Layer by Using Simple Reflux Process (Common Knowledge)

50 mg of silicalite was put into 50 ml reaction container and then, 40 ml of pure toluene was added. The toluene solution was dispersed for 5 minutes by using an ultrasonic washing machine and comb-shaped Teflon substrates and the glass plate coated with molecular sieve mono-layer of isocyanate were added into the solution. Then, a cooler was installed and refluxed for 3 hours.

Example 5

Preparation of Zeolite Y Mono-Layer on Cellulose Surface by Using 3-Chloropropyltrimethoxysilane

(1) Preparation of Zeolite Y Combined with 3-chloropropyltrimethoxysilane

Zeolite Y particles were put into a reaction container filling toluene and then, 3-chloropropylmethoxysilane was added to prepare zeolite Y coated with 3-chloropropyl molecular mono-layer on the surface by using ultrasound or simple reflux solely or by using both processes coordinately. After the reaction was completed, zeolite Y combined with 3-chloropropyl group was filtrated and washed out by using organic solvent (2) Preparation of Zeolite Y Mono-Layer by A Type Ultrasound Process Zeolite combined with 3-chloropropyl group was poured into a reaction container filling toluene and dispersed uniformly by using an ultrasonic washing machine. Then, comb-shaped Teflon substrates were put into toluene solution and inserted with a cellulose wafer in between teeth of comb. The reaction container was placed on the internal bottom of the apparatus for preparation using ultrasonic wave and fixed on a stand. The apparatus for preparation was filled with water to submerge the reaction container sufficiently until reaching the liquid level of toluene included in the container and adjusted by using a temperature controller to maintain water at 20° C. After that, zeolite Y combined with 3-chloropropyl group was attached on the surface of cellulose wafer for 2 minutes by using 28 KHz frequency of ultrasonic wave (under 95 W of electric power) through an ultrasonic generator.

(3) Preparation of Zeolite Y Mono-Layer by Using B Type Ultrasound Process

This procedure was similar to A type ultrasound process on the whole, but glass plates were overlapped in an order by glass not combining even after reacting with molecular sieve coated with 3-chloropropyl group, glass combined with 3-chloropropyl group, glass not combining even after reacting with molecular sieve coated with 3-chloropropyl group between teeth of comb in Teflon substrates, instead of one sheet of glass plate combined with 3-chloropropyl group. The other procedure was the same with A type ultrasound process.

(4) Preparation of Zeolite Y Mono-Layer by Using Simple Reflux Process (Common Knowledge)

50 mg of zeolite Y combined with 3-chloropropyl group was put into 50 ml reaction container and then, 40 ml of pure toluene was added. The toluene solution was dispersed for 5 minutes by using an ultrasonic washing machine and comb-shaped Teflon substrates and a cellulose wafer were added into the solution. Then, a cooler was installed and refluxed for 3 hours.

Example 6

Preparation of Silicalite Mono-Layer on Surface of Merrifield Resin by Using 3-Aminopropylthiethoxysilane (1) Preparation of Silicalite Combined with 3-Aminopropyltriethoxysilane Silicalite particles were put into a reaction container filling toluene and then, 3-aminopropyltriethoxysilane (APS) was added to prepare silicalite coated with 3-aminopropyl molecular mono-layer on the surface by using ultrasound or simple reflux solely or by using both processes coordinately. After the reaction was completed, silicalite combined with 3-aminopropyl group was filtrated and washed out by using organic solvent.

(2) Preparation of Silicalite Mono-Layer by A Type Ultrasound Process

Silicalite combined with above-mentioned 3-aminopropyl group was poured into a reaction container filling dichloromethane ($CH_2Cl_2$) and dispersed uniformly by using an ultrasonic washing machine. Then, some amount of Merrifield resin was added to the dichloromethane solution in the reaction container and placed on the internal bottom of the apparatus for preparation using ultrasonic wave to fix on a stand. The apparatus for preparation was filled with water to submerge the reaction container sufficiently until reaching the liquid level of dichloromethane included in the container and adjusted by using a temperature controller to maintain water at 20° C. After that, silicalite combined with 3-chloropropyl group was attached on the surface of Merrifield resin for 2 minutes by using 28 KHz frequency of ultrasonic wave (under 95 W of electric power) through an ultrasonic generator.

(3) Preparation of Silicalite Mono-Layer by Using B Type Ultrasound Process

This procedure cannot be accomplished because Merrifield resin has a spherical shape, a 3-dimensional structure and is a minute particle containing chloric acid group at the termini.

(4) Preparation of Silicalite Mono-Layer by Using Simple Reflux Process (Common Knowledge)

50 mg of silicalite combined with 3-aminopropyltriethoxysilane was put into 50 ml round flask and then, 40 ml of dichloromethane ($CH_2Cl_2$) containing Merrifield resin was added. The dichloromethane solution was dispersed for 5 minutes by using an ultrasonic washing machine before mixing silicalite and blended. Then, a cooler was installed and refluxed for 12 hours.

Example 7

Preparation of Zeolite A Mono-Layer by Using EPS and APS (1) Preparation of Glass Covered with EPS and Zeolite A Covered with APS Glass plates were put into toluene solution dissolving 3-(2, 3-epoxypropoxy)propyl]trimethoxysilane (EPS) and zeolite coated with molecular mono-layer of epoxy group on the surface was manufactured by using ultrasound or simple reflux solely or by using both processes coordinately. After the reaction was completed, the resulting glass plate was washed by using toluene several times. In addition, zeolite A particles were put into toluene solution dissolving 3-aminopropyltriethoxysilane (APS) and zeolite coated with 3-aminopropyl molecular mono-layer on the surface was made by using ultrasound or simple reflux solely or by using both processes coordinately. After the reaction was completed, the resulting zeolite was filtrated and washed out.

(2) Preparation of Zeolite A Mono-Layer by A Type Ultrasound Process

Zeolite A combined with above-mentioned 3-aminopropyl group was poured into a reaction container filing toluene and dispersed uniformly by using an ultrasonic washing machine. Then, comb shaped Teflon substrates were added to the toluene solution in the reaction container and inserted with one sheet of glass plate coated with EPS between teeth of comb. Then, the reaction container was placed on the internal bottom of the apparatus for preparation using ultrasonic wave and fixed on a stand. The apparatus for preparation was filled with water to submerge the reaction container sufficiently until reaching the liquid level of toluene included in the container and adjusted by using a temperature controller to maintain water at 20° C. After that, zeolite A combined with 3-aminopropyl group was attached on the surface of glass plate coated with EPS for 2 minutes by using 28 KHz frequency of ultrasonic wave (under 95 W of electric power) through an ultrasonic generator.

(3) Preparation of Zeolite A Mono-Layer by Using B Type Ultrasound Process

This procedure was similar to A type ultrasound process on the whole, but glass plates were overlapped in an order by glass not combining even after reacting with molecular sieve, glass combined with EPS, glass not combining even after reacting with molecular sieve between teeth of comb in a Teflon substrate, instead of one sheet of glass plate combined with EPS. The other procedure was the same with A type ultrasound process.

(4) Preparation of Zeolite A Mono-Layer by Using Simple Reflux Process (Common Knowledge)

50 mg of zeolite A combined with 3-aminopropyl group was put into 50 ml reaction container and 40 ml of pure toluene was added. The toluene solution was dispersed for 5 minutes by using an ultrasonic washing machine and comb-shaped Teflon substrates and a glass plate coated with EPS were added into the solution. Then, a cooler was installed and refluxed for 3 hours.

Example 8

Preparation of Silicalite Mono-Layer by Using Ionic Bonding (1) Preparation of Glass Combined with 3-Cyanopropyltrichlorosilane and Silicalite Combined with 3-Aminopropyl Group Glass plates were immersed in 50 ml of hexane solution containing 0.02 ml of 3-cyanopropyltrichlorosilane ($Cl_3Si(CH_2)_3CN$) and placed at room temperature for 24 hours. The resulting glass plate coated with 3-cyanopropyl group was picked out, immersed to a reaction container filling strong chloric acid and heated at 95-100° for 2 hours to convert cyano group to carboxylic acid through hydrolysis. The glass plate coated with carboxylic acid (glass-$(CH_2)_3CO_2H$) was picked out and immersed in saturated $NaHCO_3$ solution for 12 hours so as to produce glass plates that are combined with —$(CH_2)_3CO_2^-Na^+$ group after hydrogen is substituted for Na through neutralization. At this moment, any other cations such as silver ion ($Ag^+$) and ammonium ion can be used for the ion exchange.

Silicalite combined with 3-aminopropyl was put into 90% ethanol solution dissolving $NaHCO_3$ and iodomethane ($CH_3I$) and stirred at 60° C. for 24 hours. The resulting silicalite combined with $(CH_2)_3N(CH_3)_3^+I^-$ group was filtrated by using filter paper and then, washed out by using ethanol and distilled water.

(2) Preparation of Silicalite Mono-Layer by A Type Ultrasound Process

Silicalite combined with above-mentioned $(CH_2)_3N(CH_3)_3^+I^-$ group was put into a reaction container filling toluene and dispersed uniformly by using an ultrasonic washing machine. Then, comb-shaped Teflon substrates were added to toluene solution and instead between teeth of comb with one sheet of glass plate combined with $(CH_2)_3N(CH_3)_3^+I^-$ group. The, the reaction container was placed on the internal bottom of the apparatus for preparation using ultrasonic wave and fixed on a stand. The apparatus for preparation was filled with water to submerge the reaction container sufficiently until reaching the liquid level of toluene included in the container and adjusted by using a temperature controller to maintain water at 20° C. After that, silicalite combined with $(CH_2)_3N(CH_3)_3^+I^-$ group was attached on the surface of glass plate for 2 minutes by using 28 KHz frequency of ultrasonic wave (under 95 W of electric power) through an ultrasonic generator.

(3) Preparation of Silicalite Mono-Layer by Using B Type Ultrasound Process

This procedure was similar to A type ultrasound process on the whole, but glass plates were overlapped in an order by glass not combining even after reacting with molecular sieve, glass combined with $(CH_2)_3N(CH_3)_3^+I^-$ group, glass not combining even after reacting with molecular sieve between teeth of comb in a Teflon substrate, instead of one sheet of glass plate combined with $(CH_2)_3N(CH_3)_3^+I^-$ group. The other procedure was the same with A type ultrasound process (4) Preparation of Silicalite Mono-Layer by Using Simple Reflux Process (Common Knowledge)

50 mg of silicalite combined with $(CH_2)_3N(CH_3)_3^+I^-$ group was put into 50 ml reaction container and 40 ml of toluene was added. The toluene solution was dispersed for 5 minutes by using an ultrasonic washing machine and comb-shaped Teflon substrates and glass plates combined with $(CH_2)_3N(CH_3)_3^+I^-$ group were placed. Then, a cooler was installed and refluxed for 1 hour.

Example 9

Preparation of Zeolite A Mono-Layer by Using Fullerene C6060

(1) Preparation of Glass Plate Combined with Fullerene and Zeolite A Combined with 3-Aminopropyl Group Glass plates were dried at 120° C. for 3 hours, then, transferred under a vacuum, exposed to aminopropyltriethoxysilane (APS) vapor and reacted at 100° C. for 15 minutes. Then, the glass plate was recovered, washed out by using ethanol and distilled water and cured at 120° C. The resulting glass plate combined with 3-aminopropyl group was placed in toluene solution adding fullerene and heated for about 5-24 hours to combine fullerene on the glass plate.

50 mg of zeolite A washed sufficiently with distilled water and dried previously, was heated in 40 ml of toluene solution dissolving 0.3 ml of APS for 1 hour. Then, zeolite A combined with 3-aminopropyl group was filtrated, washed out by using toluene and ethanol and then, cured at 120° C. for 30 minutes.

(2) Preparation of Zeolite A Mono-Layer by A Type Ultrasound Process

Zeolite A combined with above-mentioned 3-aminopropyl group was poured into a reaction container filling toluene and dispersed uniformly by using an ultrasonic washing machine. Then, comb-shaped Teflon substrates were added to the toluene solution in the reaction container and inserted with one sheet of glass plate coated with fullerene between teeth of comb. Then, the reaction container was placed on the internal bottom of the apparatus for preparation using ultrasonic wave and fixed on a stand. The apparatus for preparation was filled with water to submerge the reaction container sufficiently until reaching the liquid level of toluene included in the container and adjusted by using a temperature controller to maintain water at 20° C. After that, zeolite A combined with 3-aminopropyl group was attached on the surface of glass plate coated with fullerene for 2 minutes by using 28 KHz frequency of ultrasonic wave (under 95 W of electric power) through an ultrasonic generator.

(3) Preparation of Zeolite A Mono-Layer by Using B Type Ultrasound Process

This procedure was similar to A type ultrasound process on the whole, but glass plates were overlapped in an order by glass not combining even after reacting with molecular sieve, glass combined with fullerene, glass not combining even after reacting with molecular sieve between teeth of comb in a Teflon substrate, instead of one sheet of glass plate combined with fullerene. The other procedure was the same with A type ultrasound process.

(4) Preparation of Zeolite A Mono-Layer by Using Simple Reflux Process (Common Knowledge)

40 mg of zeolite A combined with 3-aminopropyl group was put into 50 ml reaction container and 40 ml of pure toluene was added. The toluene solution was dispersed for 5 minutes by using an ultrasonic washing machine and comb-shaped Teflon substrates and a glass plate coated with fullerene were added into the solution. Then, a cooler was installed and refluxed for 3 hours.

Example 10

Preparation of Silicalite Mono-Layer on Gold Plate by Using 3-Chloro-1-Propanethiol (1) Preparation of Gold Plate Combined with 3-Chloropropyl Group Substrates such as glass and silicon wafer were covered with titanium or chromium in approximately 100 Å of thickness by performing vacuum evaporation under heat. Then, gold plate was covered on the layer of titanium or chromium in approximately 100 Å of thickness by performing vacuum evaporation under heat and washed out by using piranha solution mixing sulfuric acid and hydrogen peroxide solution in 7:3 of ratio. Right before use, the resulting plate was heated under a vacuum condition at 300° C. for 3 hours and then, cooled to prepare the gold plate of the present invention. The gold plate was immersed in 2 mM of ethanol solution dissolving 3-chloro-1-propanthiol for 24 hours, then picked out and washed with ethanol.

(2) Preparation of Silicalite Mono-Layer by A Type Ultrasound Process

Silicalite was poured into a reaction container filling toluene and dispersed uniformly by using an ultrasonic washing machine. Then, comb-shaped Teflon substrates were put into the solution and inserted with one sheet of gold plate combined with 3-chloropropyl group between teeth of comb. The reaction container was placed on the internal bottom of the apparatus for preparation using ultrasonic wave and fixed on a stand. The apparatus for preparation was filled with water to submerge the reaction container sufficiently until reaching the liquid level of toluene included in the container and adjusted with a temperature controller to maintain water temperature to 20° C. After that, silicalite was attached on the surface of gold plate covered with 3-chloropropyl group for 2 minutes by using 28 MHz frequency of ultrasonic wave (under 95 W of electric power) through an ultrasonic generator.

(3) Preparation of Silicalite Mono-Layer by Using B Type Ultrasound Process

This procedure was similar to A type ultrasound process on the whole, but plates were overlapped in an order by glass not combining even after reacting molecular sieve, gold plate combined with 3-chloropropyl group, glass not combining even after reacting molecular sieve between teeth of comb in Teflon substrates, instead of one sheet of gold plate combined with 3-chloropropyl group. The other procedure was the same with A type ultrasound process.

(4) Preparation of Silicalite Mono-Layer by Using Simple Reflux Process (Common Knowledge)

50 mg of zeolite was put into 50 ml round flask and 40 ml of pure toluene was added. The toluene solution was dispersed for 5 minutes by using an ultrasonic washing machine and comb-shaped Teflon substrates and the gold plate combined with 3-chloropropyl group were added into the solution. Then, a cooler was installed and refluxed for 24 hours.

Experimental Example 1-6

Experimental Example 1

Measurement of DOC Value (Degree of Coverage) in Silicalite

Figure 4:
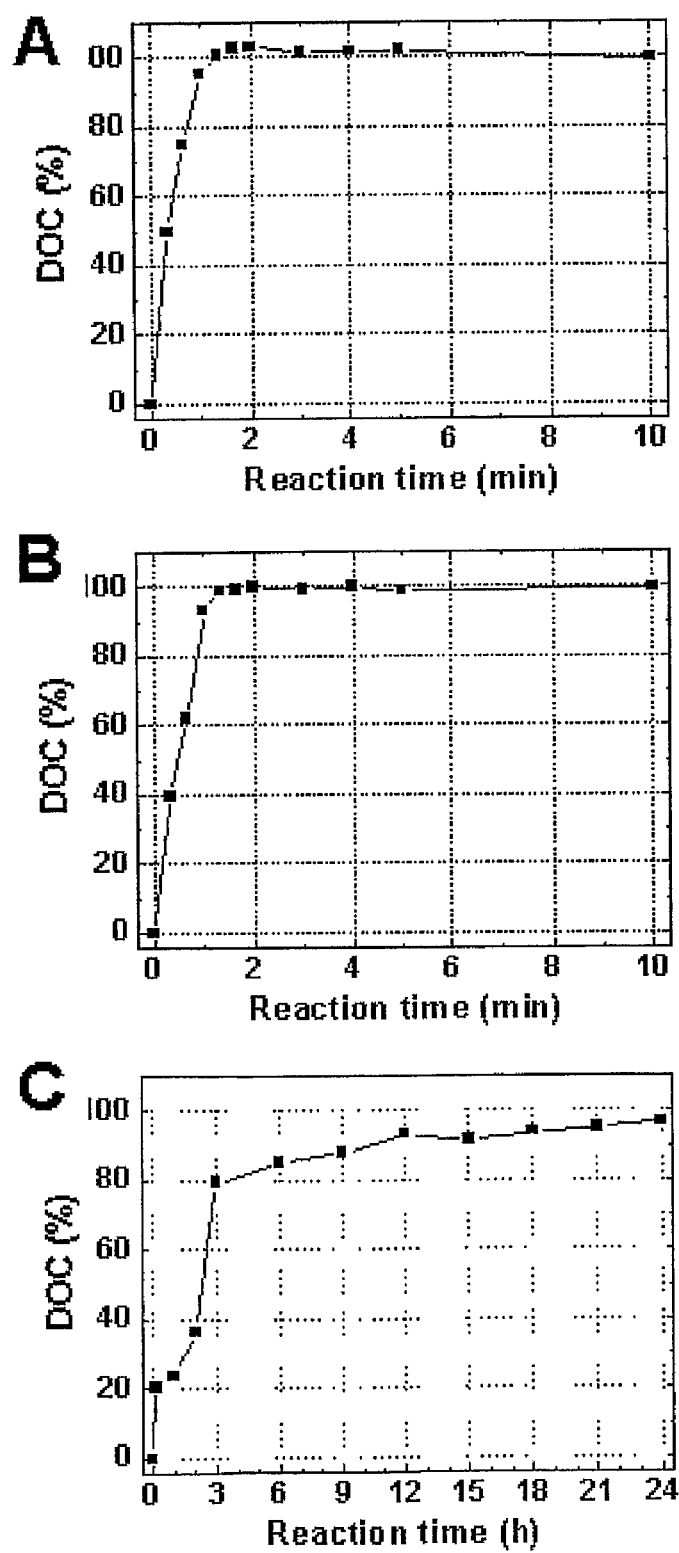
FIG. 4 depicts the degree of coverage (DOC) of silicalite according to time period after covering silicalite on glass (CP-G) that is coated with the mono-layer of 3-chloropropyl group by A type ultrasound process (A), B type ultrasound process (B), and simple reflux process (C)

As described in Example 1, (1) A type ultrasound process (A), (2) B type ultrasound process (B), and (3) simple reflux process (C) were performed to measure the degree of coverage (DOC) in silicalites on the surface of CP and the result was illustrated in FIG. 4. DOC value was estimated to % weight ratio of silicalite attached against total silicalites attached on a substrate in a condensed figuration Experimental Example 2

Comparison of Velocity of Coverage in Molecular Sieves Such as Silicalite and Zeolite As illustrated in FIGS. 4 (A), (B) and (C), A type ultrasound process and B type ultrasound process just required about 1 minute to reach nearly 100% of DOC, but the simple reflux process spent more than 24 hours to reach this DOC value. As a result, it is confirmed that the velocity of coverage should increase more than 1,400 times when using ultrasonic wave to attach a molecular sieve, compared with when using simple reflux.

The time period for reaching 100% of DOC were calculated in Example 1-10 respectively and demonstrated in Table 1 as follows. As a result, it is identified that the results were similar to those obtained in Example 1.

TABLE 1

| | Velocity of coverage | | |
| --- | --- | --- | --- |
| | 1) A type ultrasound process | 2) B type ultrasound process | 3) simple reflux process |
| Example 1 | 1 min | 1 min 20 sec | 24 hr |
| Example 2 | 1 min | 1 min | 21 hr |
| Example 3 | 1 min 30 sec | 2 min | 24 hr |
| Example 4 | 1 min | 1 min | 24 hr |
| Example 5 | 1 min | 1 min | 24 hr |
| Example 6 | 1 min | No result | 24 hr |
| Example 7 | 1 min | 1 min | 21 hr |
| Example 8 | 40 sec | 50 sec | 18 hr |
| Example 9 | 1 min 10 sec | 1 min | 24 hr |
| Example 10 | 1 min 20 sec | 1 min | 24 hr |

The velocity of coverage according to the method for preparing substrate-molecular sieve layer Experimental Example 3

Comparison of Density in Silicalite Mono-Layer

Figure 5:
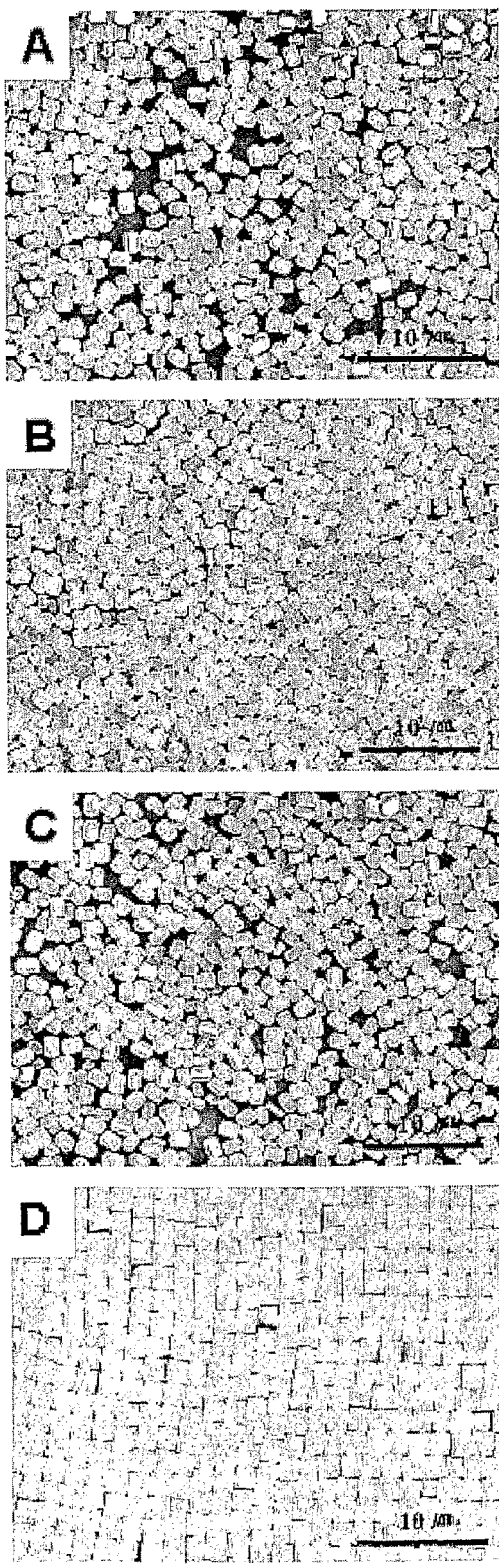
FIG. 5 depicts the scanning electron microscopic image (SEM) of mono-layer after covering silicalite on glass (CP-G) for 2 minutes by A type ultrasound process (A), for 2 minutes by B type ultrasound process (B) and for 24 hours by simple reflux process (C), and the scanning electron microscopic image (SEM after covering zeolite A on glass (CP-G) for 2 minutes by B type ultrasound process (D)

FIG. 5 depicts the scanning electron microscopic images (SEM) of the mono-layer after covering silicalites for 2 minutes by A type ultrasound process (A), for 2 minutes by B type ultrasound process (B) and for 24 hours by simple reflux process (C), as described in Example 1. As a result, it is clarified that the mono-layers coated by A type ultrasound process (A) and B type ultrasound process (B) of the present invention are high in the density, compared with the mono-layer coated by traditional simple reflux process (C). Especially, the silicalite mono-layer coated by B type ultrasound process is excellent in the density, nearly 100%. Therefore, the present invention is confirmed to reduce energy consumption remarkably and improve the density excellently, while preparing mono-layers.

Experimental Example 4

Comparison of Strength of Coverage in Mono-Layers of Molecular Sieve Such as Silicalite and Zeolite The mono-layer covered for 24 hours by simple reflux process, the mono-layer covered for 2 minutes by A type ultrasound process, and the mono-layer covered for 2 minutes by B type ultrasound process were put into glass bottle containing 10 ml of pure toluene without any molecular sieve such as silicalite or zeolite, and sonicated by using ultrasonic wave to separate silicalites. At this moment, 28 KHz frequency of ultrasonic wave was used under 95 W of electric power. The toluene solution in a small glass bottle was replaced with pure toluene every 5 minutes after exposed to ultrasonic wave. In order to measure the strength of coverage, % weight ratio of silicalite separated against total silicalite attached at the first period was estimated.

Figure 6:
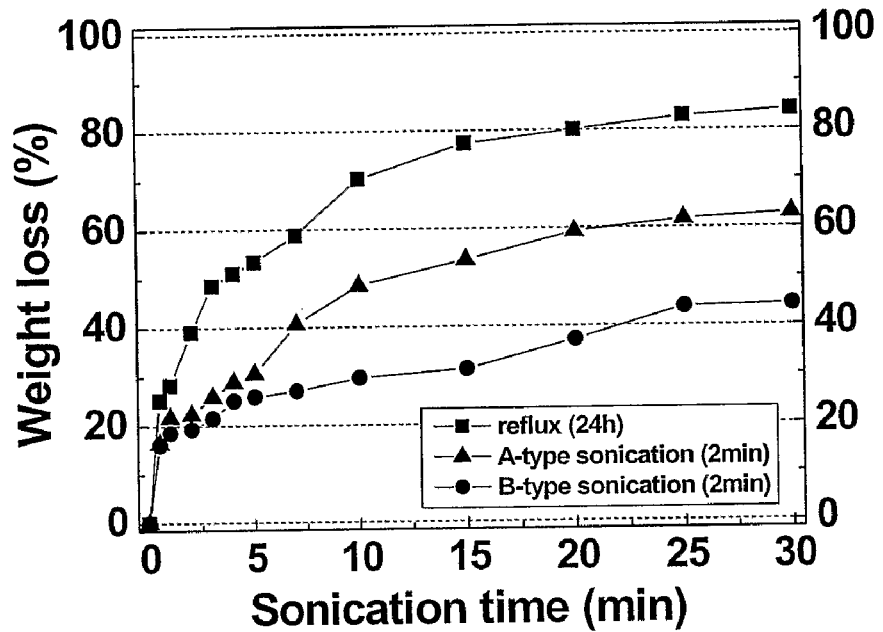
FIG. 6 depicts the degree of separation of silicalite particles after irradiating ultrasound in the presence of only pure solvent 1 on substrate-molecular sieve particle mono-layer produced after reacting for 24 hours by simple reflux process, for 2 minutes by A type ultrasound process and for 2 minutes by B type ultrasound process.

As illustrated in FIG. 6, silicalites were separated to 63% and 44% respectively in A type ultrasound process and B type ultrasound process described in Example 1, when 30 minutes were lapsed after sonication, but approximately 85% in the simple reflux process described in Example 1. Therefore, the ultrasound processes of the present invention are identified to reduce the time period of coverage, to increase the strength of coverage remarkably and indeed, can be exploited to manufacture strongly coated mono-layers, while spending little energy. Especially, B type ultrasound process increased the strength of coverage nearly 2 times, compared with conventional processes. This data are average values obtained after repeating the same experiment 5 times.

Experimental Example 5

Comparison of Velocity of Coverage According to Time Period for Attachment of Silicalite on CP-G by Ultrasound Process Mono-layers were prepared by B type ultrasound process of the present invention and DOC values of silicalites were measured respectively, when the reaction temperature was varied to 20° C., 50° C. or 80° C.

Figure 7:
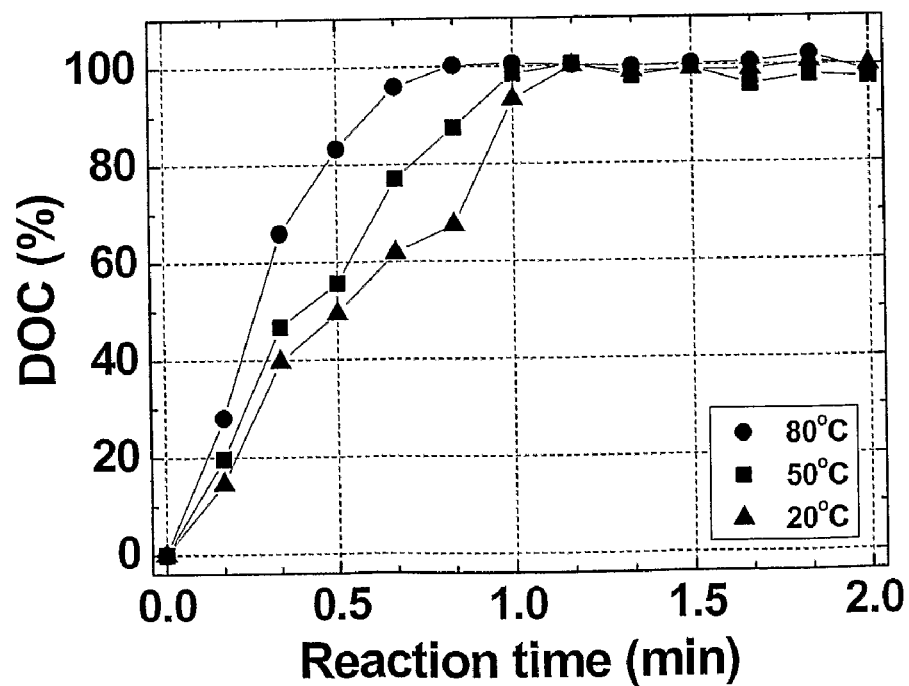
FIG. 7 depicts the effect of reaction temperature on the degree of coverage according to time period after covering silicalite on glass (CP-G) by B type ultrasound process of the present invention.

As illustrated n FIG. 7, when the temperature increases, the velocity of coverage tended to increase. However, when time period was more than 1 minute this result was not discriminated significantly, because DOC reached nearly 100% within 1 minute even at 20° C. of minimum temperature. Therefore, the ultrasound process of the present invention is advantageous to economize energy, since it can be performed effectively at a low temperature.

Experimental Example 6

Figure 8:
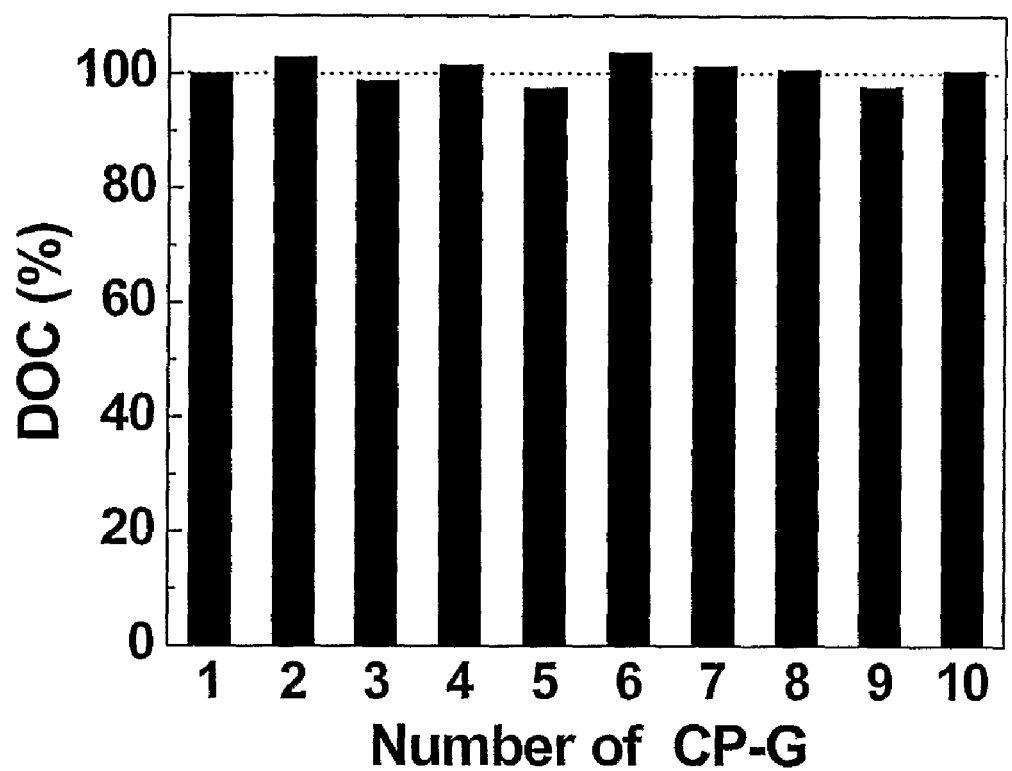
FIG. 8 depicts DOC value of silicalite particles attaching on 10 sheets of glass (CP-G) located between BG after covering silicalite particles on substrate that is overlapped in an order by 1 sheet of bare glass (BG) not combining even after reacting molecular sieve, 10 sheets of CP-G, 1 sheet of bare glass not combining even after reacting molecular sieve (BG/(CP-G)$_{10}$/BG) by using the ultrasound process of the present invention.

Application of Ultrasound Process for Producing Substrate-Molecular Sieve Layer Complex in a Large Scale 10 sheets of CP-G (BG/(CP-G)$_{10}$/BG) overlapped between BG's were inserted into a comb-shaped Teflon holder and combined with silicalites on the substrate for 5 minutes by B type ultrasound process of the present invention As illustrated in FIG. 8, it is identified that the ultrasound process of the present invention can be exploited to produce substrate-molecular sieve layer complex in a large scale, since all CP-G between BG's appear nearly 100% of DOC.

INDUSTRIAL APPLICABILITY

As illustrated and confirmed above, the method for combining molecular sieve particles on substrate in a mono-layer or multi-layer by using ultrasound helps substrate and molecular sieve particles combine through various processes, compared with the simple reflux method and further economizes time and energy to have an excellent velocity of coverage, strength of coverage, degree of coverage and density, attaches molecular sieve particles uniformly onto all substrates combined with coupling compound selectively, even if substrates without coupling compound exist together, and thus, can be used to produce substrate-molecular sieve layer complex in a large scale.

The substrate-molecular sieve layer complex will be applied for catalyst, adsorbent, ion exchanger, dehydrating agent, deodorant, sound insulator and adiabatic agent increasingly and further, utilized for new material of high-technology such as highly dense memory material, nonlinear optical material and size-isolation membrane for molecules widely in the future.

Those skilled in the art will appreciate that the conceptions and specific embodiments disclosed in the foregoing description may be readily utilized as a basis for modifying or designing other embodiments for carrying out the same purposes of the present invention.

Those skilled in the art will also appreciate that such equivalent embodiments do not depart from the spirit and scope of the invention as set forth in the appended claims.

What is claimed is:

1. A method for preparing a substrate—molecular sieve layer complex, comprising the application of 15 KHz-100 MHz of ultrasound in an induction stage which comprises of:
   (1) a first stage that:
      (a) combines a substrate and a coupling compound to prepare an intermediate 1; or
      (b) combines a molecular sieve particle and a coupling compound to prepare an intermediate 2; and
   (2) a second stage that:
      (a) combines a terminus of the coupling compound in intermediate 1 and a molecular sieve particle to form a substrate—molecular sieve layer complex; or
      (b) combines a terminus of the coupling compound in intermediate 2 and a substrate to form a substrate—molecular sieve layer complex;
   wherein
   the substrate is a silicon wafer;
   the molecular sieve particle is silicalite-1; and
   the coupling compound is 3-chloropropyltrimethoxysilane.

2. A method for preparing a substrate—molecular sieve layer complex, comprising
   applying 15 KHz-100 MHz of ultrasound in an induction stage that:
      (a) combines a substrate and a coupling compound to prepare an intermediate 1; and
      (b) combines a molecular sieve particle and a coupling compound to prepare an intermediate 2;
   wherein the substrate is a silicon wafer;
   wherein the molecular sieve particle is silicalite-1;
   wherein the coupling compound is 3-chloropropyltrimethoxysilane; and
   wherein the induction stage further (c) combines a terminus of coupling compound in the intermediate 1 and a terminus of coupling compound in the intermediate 2.

3. A method for preparing a substrate—molecular sieve layer complex, comprising
   applying 15 KHz-100 MHz of ultrasound in an induction stage that:
      (a) combines a substrate and a coupling compound to prepare an intermediate 1; and
      (b) combines a molecular sieve particle and a coupling compound to prepare an intermediate 2,
   wherein the substrate is a silicon wafer;
   wherein the molecular sieve particle is silicalite-1;
   wherein the coupling compound is 3-chloropropyltrimethoxysilane;
   wherein the induction stage further:
      (c) combines a terminus of an intermediate coupling compound with a terminus of coupling compound in the intermediate 2 or a terminus of coupling compound in the intermediate 1; and
      (d) combines the intermediate coupling compound that has been combined with the intermediate 1 or the intermediate 2 with another intermediate 2 or intermediate 1 to form a substrate—molecular sieve layer complex.

4. The method for preparing a substrate—molecular sieve layer complex according to claim 1, wherein the induction stage combines the substrate, the coupling compound and the molecular sieve particle in order to prepare a substrate—coupling compound—coupling compound—molecular sieve particle complex.

5. The method for preparing a substrate—molecular sieve layer complex according to claim 1, further comprising a second induction stage followed by the induction stage that forms a molecular sieve mono-layer on the substrate, wherein the second induction stage comprises combining a second molecular sieve particle with the molecular sieve mono-layer formed in the induction stage via a coupling compound by using 15 KHz-100 MHz of ultrasound.

6. The method for preparing a substrate—molecular sieve layer complex according to claim 5, in which the second induction stage is performed repeatedly several times to prepare a molecular sieve multi-layer.

* * * * *